United States Patent
Venkitachalam et al.

(10) Patent No.: US 7,500,048 B1
(45) Date of Patent: Mar. 3, 2009

(54) TRANSPARENT PAGE SHARING ON COMMODITY OPERATING SYSTEMS

(75) Inventors: Ganesh Venkitachalam, Mountain View, CA (US); Michael Cohen, Wayne, NJ (US)

(73) Assignee: VMware, Inc., Palo Alto, CA (US)

( * ) Notice: Subject to any disclaimer, the term of this patent is extended or adjusted under 35 U.S.C. 154(b) by 309 days.

(21) Appl. No.: 11/525,764

(22) Filed: Sep. 22, 2006

Related U.S. Application Data (60) Provisional application No. 60/750,976, filed on Dec. 15, 2005.

(51) Int. Cl.
G06F 12/00 (2006.01)
(52) U.S. Cl. .......................................... 711/6; 711/147
(58) Field of Classification Search .................. None
See application file for complete search history.

(56) References Cited

U.S. PATENT DOCUMENTS

| | | | |
|---|---|---|---|
| 6,789,156 B1* | 9/2004 | Waldspurger | 711/6 |
| 7,356,665 B2* | 4/2008 | Rawson, III | 711/202 |
| 2005/0160151 A1* | 7/2005 | Rawson, III | 709/213 |
| 2008/0147956 A1* | 6/2008 | Rawson | 711/6 |

* cited by examiner

*Primary Examiner*—Kevin Verbrugge
(74) *Attorney, Agent, or Firm*—Rajeev Madnawat

(57) ABSTRACT

Methods and systems for sharing memory pages in virtual machines are described. Guest memory pages are identified as candidate memory pages. The candidate memory pages are hashed and the hash results of the candidate memory pages are compared. A determination is made on whether a hash match exists between a first candidate memory page and a second candidate memory page. If it is determined that a hash match exists, an anonymous memory page that includes the information of candidate memory pages is created and shared. As a result, embodiments effectively reduce memory overheads by, in one example, exposing a single anonymous memory page to multiple virtual machines.

22 Claims, 6 Drawing Sheets

TRANSPARENT PAGE SHARING ON COMMODITY OPERATING SYSTEMS

CROSS-REFERENCE TO RELATED APPLICATION(S)

This application claims benefit under 35 U.S.C. § 119(e) of U.S. Provisional Application No. 60/750,976, filed Dec. 15, 2005.

BACKGROUND OF THE INVENTION

1. Field of the Invention

This invention relates to the sharing of memory pages among virtual machines

2. Description of the Related Art

Figure 1:
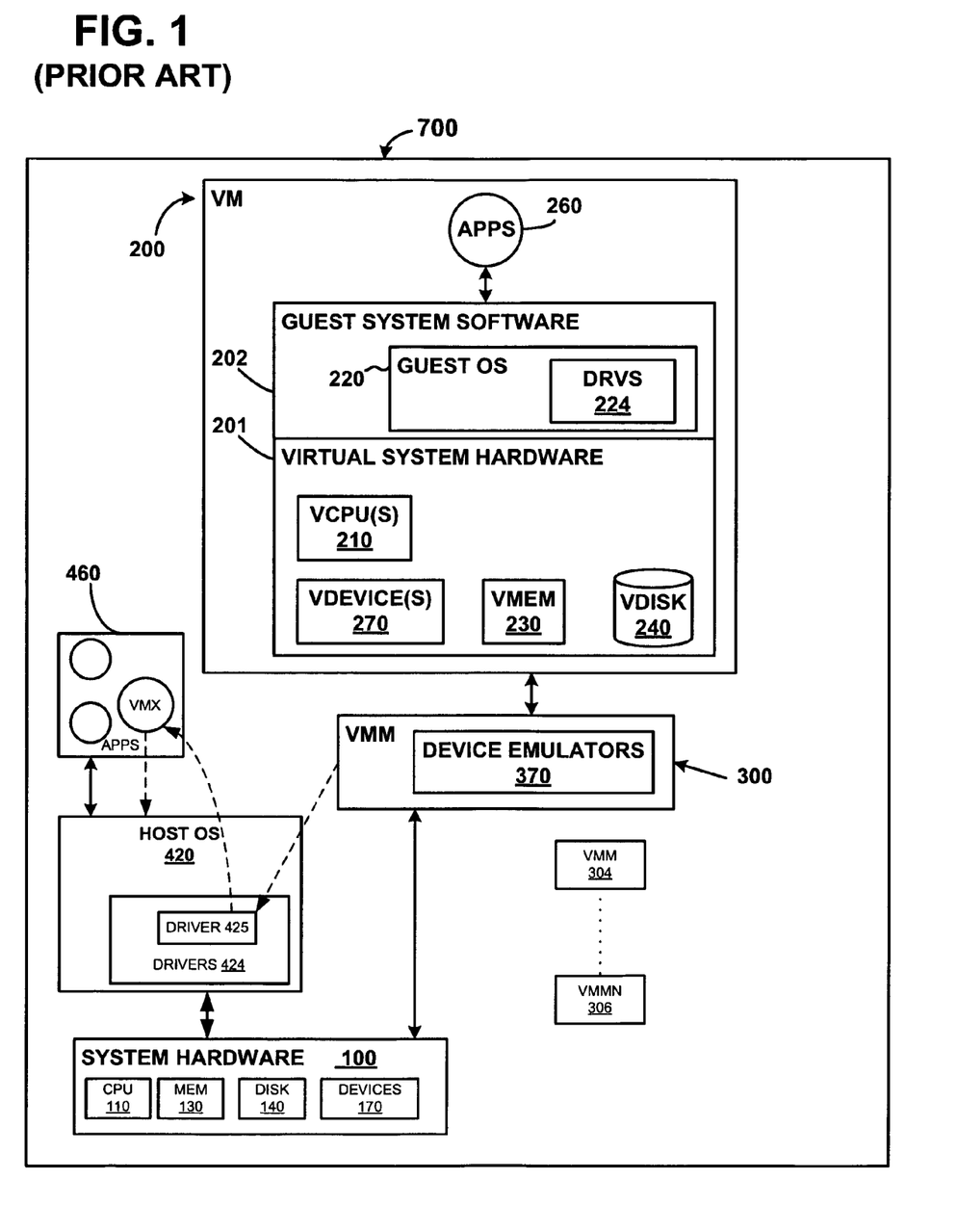
FIG. 1 (Prior Art) illustrates one possible arrangement of a computer system that implements virtualization on a hosted system, upon which embodiments can be implemented.

The advantages of virtual machine technology have become widely recognized. Among these advantages is the ability to run multiple virtual machines on a single host platform. This makes better use of the capacity of the hardware while still ensuring that each user enjoys the features of a complete computer. Depending on how it is implemented, virtualization also provides greater security, since the virtualization can isolate potentially unstable or unsafe software so that it cannot adversely affect the hardware state or system files required for running the physical (as opposed to virtual) hardware As is well known in the field of computer science, a virtual machine (VM) is a software abstraction—a "virtualization"—of an actual physical computer system. FIG. 1 shows one possible arrangement of a computer system 700 that implements virtualization. A virtual machine (VM) 200, which in this system is a "guest," is installed on a "host platform" or simply host which will include a system hardware 100, that is, a hardware platform, and one or more layers or co-resident components comprising system-level software, such as an operating system (OS) or similar kernel, a virtual machine monitor or hypervisor (see below), or some combination of these.

As software, the code defining the VM will ultimately execute on the actual system hardware 100. As in almost all computers, this hardware will include one or more CPUs 110, some form of memory 130 (volatile or non-volatile), one or more storage devices such as one or more disks 140, and one or more devices 170, which may be integral or separate and removable.

In many existing virtualized systems, the hardware processor(s) 110 are the same as in a non-virtualized computer with the same platform, for example, the Intel x86 platform. Because of the advantages of virtualization, some hardware vendors have proposed, and are presumably developing, hardware processors that include specific hardware support for virtualization.

Each VM 200 will typically mimic the general structure of a physical computer and as such will usually have both virtual system hardware 201 and guest system software 202. The virtual system hardware typically includes at least one virtual CPU 210, virtual memory 230, at least one virtual disk 240 and one or more virtual devices 270. Note that a storage disk—virtual 240 or physical 140—is also a device, but is usually considered separately because of the important role it plays. All of the virtual hardware components of the VM may be implemented in software to emulate corresponding physical components. The guest system software includes a guest operating system (OS) 220 and drivers 224 as needed, for example, for the various virtual devices 270.

A single VM may (but need not) be configured with more than one virtualized physical and/or logical processor. Each virtualized processor in a VM may also be multi-core, or multi-threaded, or both, depending on the virtualization. This invention may be used to advantage regardless of the number of processors the VMs are configured to have.

If the VM 200 is properly designed, applications 260 running on the VM will function essentially as they would if run on a "real" computer, even though the applications are running at least partially indirectly, that is via the guest OS 220 and virtual processor(s). Executable files will be accessed by the guest OS from the virtual disk 240 or virtual memory 230, which will be portions of the actual physical disk 140 or memory 130 allocated to that VM. Once an application is installed within the VM, the guest OS retrieves files from the virtual disk just as if the files had been pre-stored as the result of a conventional installation of the application. The design and operation of virtual machines in general are known in the field of computer science.

Some interface is generally required between the guest software within a VM and the various hardware components and devices in the underlying hardware platform. This interface—which may be referred to generally as "virtualization software"—may include one or more software components and/or layers, possibly including one or more of the software components known in the field of virtual machine technology as "virtual machine monitors" (VMMs), "hypervisors," or virtualization "kernels." Because virtualization terminology has evolved over time and has not yet become fully standardized, these terms do not always provide clear distinctions between the software layers and components to which they refer. For example, "hypervisor" is often used to describe both a VMM and a kernel together, either as separate but cooperating components or with one or more VMMs incorporated wholly or partially into the kernel itself; however, "hypervisor" is sometimes used instead to mean some variant of a VMM alone, which interfaces with some other software layer(s) or component(s)—sometimes including the host OS itself—to support the virtualization. Moreover, in some systems, some virtualization code is included in at least one "superior" VM to facilitate the operations of other VMs. Furthermore, specific software support for VMs is sometimes included in the host OS itself.

Unless otherwise indicated, the invention described below may be used in virtualized computer systems having any type or configuration of virtualization software. Moreover, the invention is described and illustrated below primarily as including one or more virtual machine monitors that appear as separate entities from other components of the virtualization software. This is only for the sake of simplicity and clarity and by way of illustration—as mentioned above, the distinctions are not always so clear-cut. Again, unless otherwise indicated or apparent from the description, it is to be assumed that the invention can be implemented anywhere within the overall structure of the virtualization software.

By way of illustration and example only, the figures show a VM (only one of which is shown, for simplicity) running on a corresponding virtual machine monitor. The description's reference to VMMs is also merely by way of common example. A VMM is usually a software component that virtualizes at least one hardware resource of some physical platform, so as to export a hardware interface to the VM corresponding to the hardware the VM "thinks" it is running on. A virtualized computer system may (and usually will) have more than one VM, each of which may be running on its own VMM.

The various virtualized hardware components in the VM, such as the virtual CPU(s) 210, etc., the virtual memory 230, the virtual disk 240, and the virtual device(s) 270, are shown as being part of the VM 200 for the sake of conceptual simplicity. In actuality, these "components" are often implemented as software emulations included in some part of the virtualization software, such as the VMM. One advantage of such an arrangement is that the virtualization software may (but need not) be set up to expose "generic" devices, which facilitate, for example, migration of a VM from one hardware platform to another.

Different systems may implement virtualization to different degrees—"virtualization" generally relates to a spectrum of definitions rather than to a bright line, and often reflects a design choice in respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

Another concept that has yet to achieve a universally accepted definition, is that of "para-virtualization." As the name implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software. For some, para-virtualization implies that the guest OS (in particular, its kernel) is specifically designed to support such an interface. According to this view, having, for example, an off-the-shelf version of Microsoft Windows XP as the guest OS would not be consistent with the notion of para-virtualization. Others define para-virtualization more broadly to include any guest OS with any code that is specifically intended to provide information directly to the other virtualization software. According to this view, loading a module such as a driver designed to communicate with other virtualization components renders the system para-virtualized, even if the guest OS as such is an off-the-shelf, commercially available OS not specifically designed to support a virtualized computer system. Unless otherwise indicated or apparent, this invention is not restricted to use in systems with any particular "degree" of virtualization and is not to be limited to any particular notion of full or partial ("para-") virtualization.

With regards to utilization of memory 130, conventionally, the address space of the memory 130 is partitioned into pages, regions, or other analogous allocation units. With non-virtualized systems, a single level of addressing indirection is involved. For example, applications address the physical memory 130 using virtual addresses (VAs), each of which typically comprises a virtual page number (VPN) and an offset into the indicated page. The VAs are then mapped to physical addresses (PAs), each of which similarly comprises a physical page number (PPN) and an offset, and which is actually used to address the physical memory 130. The same offset is usually used in both a virtual address and its corresponding physical address, so that only the VPN needs to be converted into a corresponding PPN.

The concepts of VPNs and PPNs, as well as the way in which the different page numbering schemes are implemented and used, are described in many standard texts, such as "Computer Organization and Design: The Hardware/Software Interface," by David A. Patterson and John L. Hennessy, Morgan Kaufmann Publishers, Inc., San Francisco, Calif., 1994, pp. 579-603 (chapter 7.4 "Virtual Memory"). Similar mappings are used in region-based architectures or, indeed, in any architecture where relocatability is possible.

In architectures that provide access control bits, these bits are typically associated with virtual pages in translation lookaside buffer (TLB) entries. The hardware MMU enforces the access control bits during VPN→PPN translation in the system's translation lookaside buffer (TLB).

In contrast to non-virtualized systems, virtualized systems, such as virtual machine 200 in FIG. 1, require an extra level of addressing indirection. For virtual machine 200 a virtual page number (VPN) is issued by an application (e.g., APPS 260) running in the VM 200. The VPN is remapped twice in order to determine which page of the hardware memory is intended. The first mapping is provided by the guest OS 220, which translates the guest VPN (GVPN) into a corresponding guest PPN (GPPN) in the conventional manner. The guest OS 220 therefore "believes" that it is directly addressing the actual hardware memory 130, but in fact it is not.

Of course, a valid address to the actual hardware memory must ultimately be generated. A memory management module, located typically in the VMM 300, therefore performs the second mapping by taking the GPPN issued by the guest OS 220 and mapping it to a hardware (or "machine") page number PPN that can be used to address the hardware memory 130. This GPPN-to-PPN mapping may instead be done in the main system-level software layer, depending on the implementation. From the perspective of the guest OS 220, the GVPN and GPPN might be virtual and physical page numbers just as they would be if the guest OS were the only OS in the system. From the perspective of the system software, however, the GPPN is a page number that is then mapped into the physical memory space of the hardware memory 130 as a PPN.

The addressable space of the disk(s), and therefore also of the virtual disk(s), is similarly subdivided into separately identifiable portions such as blocks or sectors, tracks, cylinders, etc. In general, applications do not directly address the disk; rather, disk access and organization are tasks reserved to the operating system, which follows some predefined file system structure. When the guest OS 220 wants to write data to the (virtual) disk, the identifier used for the intended block, etc., is therefore also converted into an identifier into the address space of the physical disk. Conversion may be done within whatever system-level software layer that handles the VM.

Furthermore, as is well known, in most modern computer architectures, system memory is typically divided into individually addressable units or blocks commonly known as "pages," each of which in turn contains many separately addressable data words, which in turn will usually comprise several bytes. A page is usually (but not necessarily) the minimum amount of memory that the operating system allocates or loads at a time. This invention does not presuppose any particular page size, or even that the page size must be constant. Pages are identified by addresses commonly referred to as "page numbers;" other architectures have identifiers that are analogous to page numbers. Without loss of generality, it is therefore assumed by way of example below that the memory is arranged in pages, each of which is identified by a page number.

As illustrated in FIG. 1, and as described in U.S. Pat. No. 6,496,847, one way for the VMM to have the host OS perform certain tasks (such as I/O) on its behalf is for the VMM to call through a driver 425 (for example, one of the drivers 424) in the host OS to a user-level application VMX, which then can submit the task request to the host OS, possibly via whatever application program interface (API) the host OS interposes. In one embodiment, the driver 425 is installed in the host OS to specifically enable calls from the VMM. The VMM, instead of calling directly into an application that is running in the host OS context, calls through driver 425, up to the VMX, and back down to the host OS via its existing API. This allows the VMM to communicate with the host OS but remain at system level, and without requiring any modification to the host OS other than the installation of a suitable driver.

In some implementations, multiple virtual machines often have memory pages with identical content, particularly for program code and filesystem buffer cache data. For example, if multiple virtual machines are running the same guest OS, the same portions of the OS code may be resident in multiple physical memory pages at the same time for execution within different virtual machines. Thus, for a particular page worth of OS code, there may be multiple copies of the page in memory, with one copy of the page being associated with each of multiple VMs. To reduce memory overhead, a virtual machine monitor can reclaim such redundant memory pages, leaving only a single copy of the memory page to be shared by the multiple virtual machines.

Embodiments relate to mechanisms for sharing pages between virtual machines in which the virtual machine monitor lets the host manage I/O, memory allocation, and paging. In this environment, a virtual machine application may choose to represent the virtual machine's memory as a file in the host filesystem to allow the host to manage the associated memory. This design is simple, portable, and does not require a custom operating system to run the virtual machine monitor. For example, an I/O request initiated by the virtual machine would percolate through various layers of device emulation and finally translate to a read, write, or mmap system call on the host operating system.

The sharing of memory between virtual machines can persist as long as none of the virtual machines chooses to write to the shared memory pages. If a write occurs, the virtual machine must break sharing for the modified page and obtain a private copy of the shared memory. Otherwise, one virtual machine could be operating off of what, to it, would be invalid data because another virtual machine had written to the same shared memory. Furthermore, sharing memory between virtual machines when a file backs main memory is challenging. Typically, as the contents of the files are written or otherwise modified, the data is written back to a non-volatile, persistent main memory to preserve the data. With multiple shared memories, it becomes harder to ensure that the data retained in the main memory accurately tracks that of the files. The VMM therefore preferably lets the host device manage all hardware memory. When the VM wants guest GPPNs, it asks the host to supply them. Maintaining data coherency is especially complex when sharing pages and subsequently breaking shared pages is implemented.

The virtualization software can choose to represent guest memory as a file on the host. This allows the virtualization software to use the host OS to access the file (e.g. read( ), write( ), mmap( ) munmap( )). The host OS will have the flexibility to pageout unlocked in-memory guest pages to the file, reclaim the memory page for other uses, and retrieve the contents of the guest page later on by accessing the file when the virtualization software asks for the page. The virtualization software will have the flexibility of allowing the host OS to do these operations, and yet get back the exact contents of guest memory when it needs the contents by accessing the file (with mmap( ) or read( )/write( ) operations). The backing file enables the host OS to page guest memory in and out of physical memory, as needed or as appropriate. Thus, the contents of the guest memory do not have to be always stored in physical memory.

The virtual machine monitor requires knowledge of the hardware physical page number (PPN), associated with each guest physical page number (GPPN). Consider the scenario in which a shared hardware physical memory page is in use by several virtual machines and the host operating system supplies a hardware physical memory page associated with one of the backing files. If a virtual machine wants to write to that page, the virtual machine application must contact all other virtual machines sharing that physical memory page and wait for them to evict the physical memory page from their emulated TLBs. This requires co-operation between VMs, weakens isolation guarantees between virtual machines, and would likely be prohibitively expensive.

SUMMARY OF THE INVENTION

This invention comprises methods and systems for sharing memory pages in virtual machines. In one embodiment, the methods and systems for sharing memory pages are applicable to hosted systems. Guest memory pages are identified as candidate memory pages. The candidate memory pages are hashed and the hash results of the candidate memory pages are compared. A determination is made on whether a match exists between a first candidate memory page and a second candidate memory page. If it is determined that a match exists, an anonymous memory page that includes the information of the candidate memory pages is created and shared. As a result, embodiments effectively reduce memory overheads by, in one example, exposing a single anonymous memory page to multiple virtual machines.

DETAILED DESCRIPTION

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which can be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention can be practiced without these specific details. In other instances, well known methods, procedures, components, and circuits have not been described in detail as not to unnecessarily obscure aspects of the invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout this text, discussions utilizing terms such as "setting," "storing," "scanning," "receiving," "sending," "disregarding," "entering," or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

This invention relates to a mechanism for sharing pages between virtual machines. In one example, the present invention is applicable to environments in which the virtual machine monitor lets the host manage I/O, memory allocation, and paging. In this environment, a virtual machine application may choose to represent the virtual machine's memory as a file in the host filesystem to allow the host to manage the associated memory. For example, an I/O request initiated by the virtual machine would percolate through various layers of device emulation and finally translate to a read or write system call on the host operating system. In one embodiment, guest memory pages are identified as candidate memory pages. The candidate memory pages are compared and a determination is made as to whether the first and second candidate memory pages match. For well know reasons of efficiency, the comparison is preferably made by hashing the contents of each page and comparing the hash results; of course, other comparison methods—including even a "brute force" byte-wise comparison—could also be used; hashing is assumed in the description below by way of example.

If it is determined that a hash match exists, an anonymous memory page that includes the information of the first candidate memory page and the second candidate memory page is created and shared. An anonymous memory page is a page that is not mapped in any process address space. Anonymous pages are locked in memory so that they cannot be swapped out to disk. The sharing process reduces memory by unlocking two (or more) non-anonymous pages, allowing the host to swap them out, and replacing them with a single, read-only locked anonymous page. As a result, embodiments efficiently reduce memory overheads by, in one example, exposing a single anonymous memory page to multiple virtual machines.

Moreover, in one embodiment, transparent page sharing on commodity operating systems requires modifications to a host device driver associated with the virtual machine application, the userlevel portion of the virtual machine application (VMX), and the virtual machine monitor (VMM). Further, in one embodiment, the VMX inspects each sharing candidate to ensure that it is not being accessed by device emulation code, such as DMA.

In one embodiment, page sharing is implemented by identifying guest memory pages as potential sharing candidates. The guest memory pages may, in one example, be chosen at random from the virtual machine's guest memory. In another example, the guest memory pages may be chosen by some heuristic based on guest behavior. In one embodiment, prior to sharing, these guest memory pages are evicted from the TLBs in the virtual machine monitor and the virtual machine monitor must be unable to access these guest pages until the sharing process is complete. In one embodiment, in an emulated SMP virtual machine this requires coordinating multiple virtual machine monitor threads representing multiple virtual CPUs.

Furthermore, the VMX inspects each sharing candidate to ensure that it is not being accessed by device emulation code, such as virtual DMA. A host driver that has knowledge of all virtual machines receives the list of page sharing candidates. The host driver computes a hash of the contents of each sharing candidate to quickly search for matches. If the hashes match, the host driver does a direct byte comparison of page contents prior to actually sharing pages. The host driver maintains two linked lists (e.g., a chaining hash table) to track the status of shared pages. One list contains an entry for each unique shared PPN and its hash. It also includes per-VM reference counts to allow the host driver to know when a shared page is no longer in use and free its associated memory. Specifically, the per-VM reference count is used to keep track of the number of references, pointers, or handles to a resource such as an object or block of memory. A per-VM reference count is used to track the number of remaining device accesses associated with a page.

In one example, a page is not shared until the per-VM reference count is zero, which indicates device accesses have completed. A second list tracks "hint" pages that are potential sharing candidates. When a sharing candidate does not match any unique shared page, the host driver records the guest page number, a unique virtual machine ID, and the hash of the page. Subsequent sharing attempts try to match against this hint list to identify sharing opportunities. If a match on the shared list occurs, the shared PPN is returned to the virtual machine. If a match on the hint list occurs, a new shared PPN is allocated using a host specific API. The virtual machine indicated by the hint is sent an asynchronous message to attempt to re-share the corresponding guest page. The list of shared guest pages and corresponding shared PPN is passed back to the virtual machine monitor. The virtual machine monitor can cache these PPN's in its TLBs for use by the guest operating system.

With regards to emulated device interaction, device accesses to main memory are channeled through an interface that supports the functions of getting a pointer to a range of guest physical memory and releasing this pointer (PhysMem_Get/PhysMem_Release). When a device issues a PhysMem_Get for read access to a shared page, the file backed main memory pages for this virtual machine are returned. This may require paging on the host but this process is transparent to the virtual machine application.

When a device issues a PhysMem_Get for write access, the interface must notify the virtual machine monitor to break sharing on a guest memory page. The monitor must process this message prior to touching guest memory or executing any guest instructions. The device can proceed by accessing memory through the file backed main memory just as in the case of a read.

When attempting to share a page, it is necessary to avoid pages that have outstanding device accesses pending. Since we break sharing when we begin a PhysMem_Get call, we must ensure that we do not share pages for which a device initiated an access (PhysMem_Get) that has not yet completed it (PhysMem_Release). This is implemented by reference counting blocks of guest memory accessed via this interface. Prior to attempting to share a page, it is necessary to check its reference count to make sure it is not part of pending device access. A page cannot be shared until this reference count becomes zero, indicating device accesses have completed.

Figure 2:
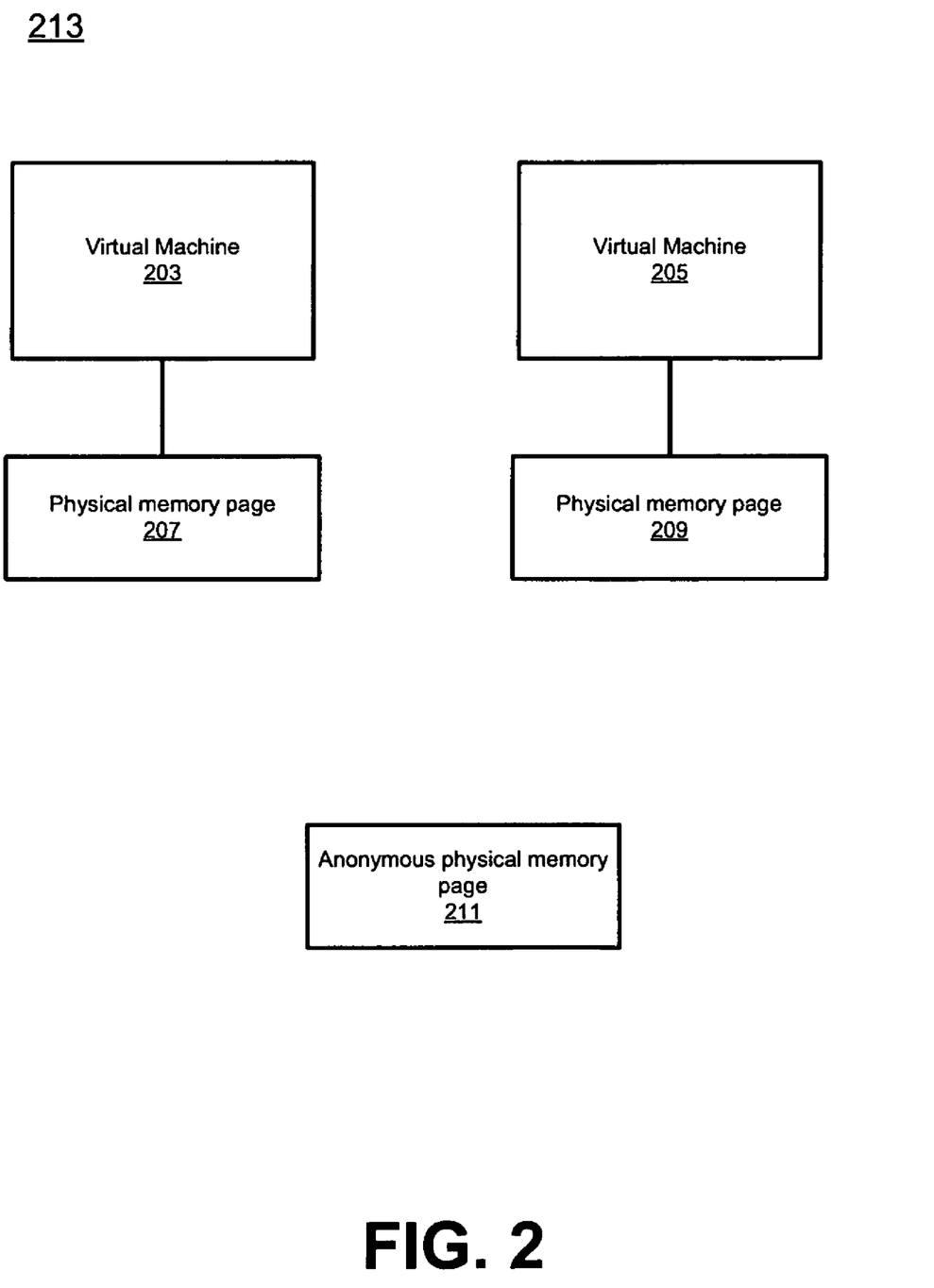
FIG. 2 illustrates a system for sharing of memory pages, upon which embodiments can be implemented.

FIG. 2 illustrates a system 213 for sharing of memory pages, upon which embodiments can be implemented. System 213 includes virtual machine 203, virtual machine 205, guest physical memory page 207, guest physical memory page 209, and anonymous physical memory page 211. Although system 213 for sharing of memory pages is shown and described as having certain numbers and types of elements, the embodiments are not necessarily limited to the exemplary implementation. That is, system 213 for sharing of memory pages can include elements other than those shown, and can include more than one of the elements that are shown. For example, system 213 for sharing of memory pages can include a greater or fewer number of virtual machines than the two virtual machines (virtual machine 203 and virtual machine 205) shown. Similarly, in another example, system 213 for sharing of memory pages includes a greater number of physical memory pages than the two physical memory pages (guest physical memory page 207 and guest physical memory page 209) shown.

In one embodiment, guest physical memory page 207 and guest physical memory page 209 are identified as candidate pages for sharing. In one embodiment, guest physical memory page 207 and guest physical memory page 209 are chosen at random from the virtual machine's guest memory. In one embodiment, guest physical memory page 207 and guest physical memory page 209 are chosen by a heuristic based analysis of guest behavior.

In one example, it is determined that the contents of guest physical memory page 207 are identical to guest physical memory page 209. Determination that the contents of guest physical memory page 207 are identical to guest physical memory page 209 can be implemented in different ways. In one example, hash values are computed for guest physical memory page 207 and guest physical memory page 209 and compared to see if a hash value match exists. Further, in one example, a direct byte comparison between guest physical memory page 207 and guest physical memory page 209 is performed.

In one embodiment, for a page that will be shared between virtual machines, a shared physical memory page, also referred to as an anonymous physical memory page, is allocated by a VM monitor driver and the contents of the page are copied to this shared physical memory page. For example, the contents of physical memory page 207 are copied to anonymous physical memory page 211. In one embodiment, anonymous physical memory page 211 is not mapped in any address space on the host and does not belong to the file-backed memory of any virtual machine. Also, the host does not use the anonymous physical memory page 211. Also, in another embodiment, virtual machines that share a guest page with these contents use this shared physical memory page and can unlock the physical memory page obtained from the backing file. Thus, memory is saved because one shared physical memory page is utilized in place of N non-shared physical memory pages. In one embodiment, after the physical memory pages are unlocked from the backing file, the host can reclaim the physical memory pages and reuse them based on its specific paging policy. In one embodiment, only the shared physical memory page needs to be locked in memory for use by virtual machines.

In one embodiment, enablement of page sharing depends on implementing three key operations: first, sharing pages with identical contents between virtual machines; second, allowing access to the shared page to device emulation, host operating system, threads or processes running on the host, and other components of the virtual machine application; and third, breaking sharing when a virtual machine writes to a page.

Candidate pages are identified using the content-based approach. However, when determining a candidate page for sharing, guest pages that are currently in use by the host operating system or other parts of the virtual machine application may be excluded. This is usually a small fraction of the memory assigned to the guest operating system. For each unique page that will be shared between virtual machines, the invention preferably allocates a "shared" machine memory page or anonymous memory page and copies the contents of the page to be shared to this shared machine memory page. Note that this anonymous memory page need not be mapped in any address space on the host and does not belong to the file backed memory of any virtual machine. Instead of using the machine memory page from one of the two backing memory files for the virtual machines, the invention uses this "shared" or "anonymous" machine memory page. All virtual machines that have shared a guest page with these contents use this shared machine memory page and unlock the machine memory page obtained from the backing file. This is where the invention saves memory by using one shared machine memory page instead of N non-shared machine memory pages. After the machine memory pages obtained from the backing file are unlocked, the host can reclaim those machine memory pages and reuse them based on its paging policy. Only the shared/anonymous machine memory page needs to be locked in memory for use by virtual machines.

When the virtual machine monitor requires read access to a shared page, it accesses the shared/anonymous machine memory page instead of the machine memory page corresponding to its main memory file. If device emulation or other parts of the virtual machine application require access to the guest page, the backing file for this virtual machine is accessed and the host manages the associated memory. By definition, the backing file and the unique shared machine memory page have the same contents.

If device emulation code or parts of the virtual machine application need write access to a guest page in the shared state, the backing file machine memory page is provided and the host manages the associated memory. However, unlike the read case, the emulation code notifies the virtual machine monitor to evict the shared/anonymous machine memory page from its TLBs and return to the file backed machine memory page for this virtual machine. Note that such accesses happen outside the virtual machine monitor context and it is sufficient to flush the guest TLBs managed by the VMM before we reflect the effects of the host-side write to the guest. This is true for all emulated I/O accesses. If the virtual machine monitor needs to write to the shared/anonymous machine memory page, it flushes the guest TLBs prior to accessing the memory and then uses the machine memory page that the host provides from the guest main memory file. Both of these operations can be performed without the help of any other virtual machines.

Figure 3:
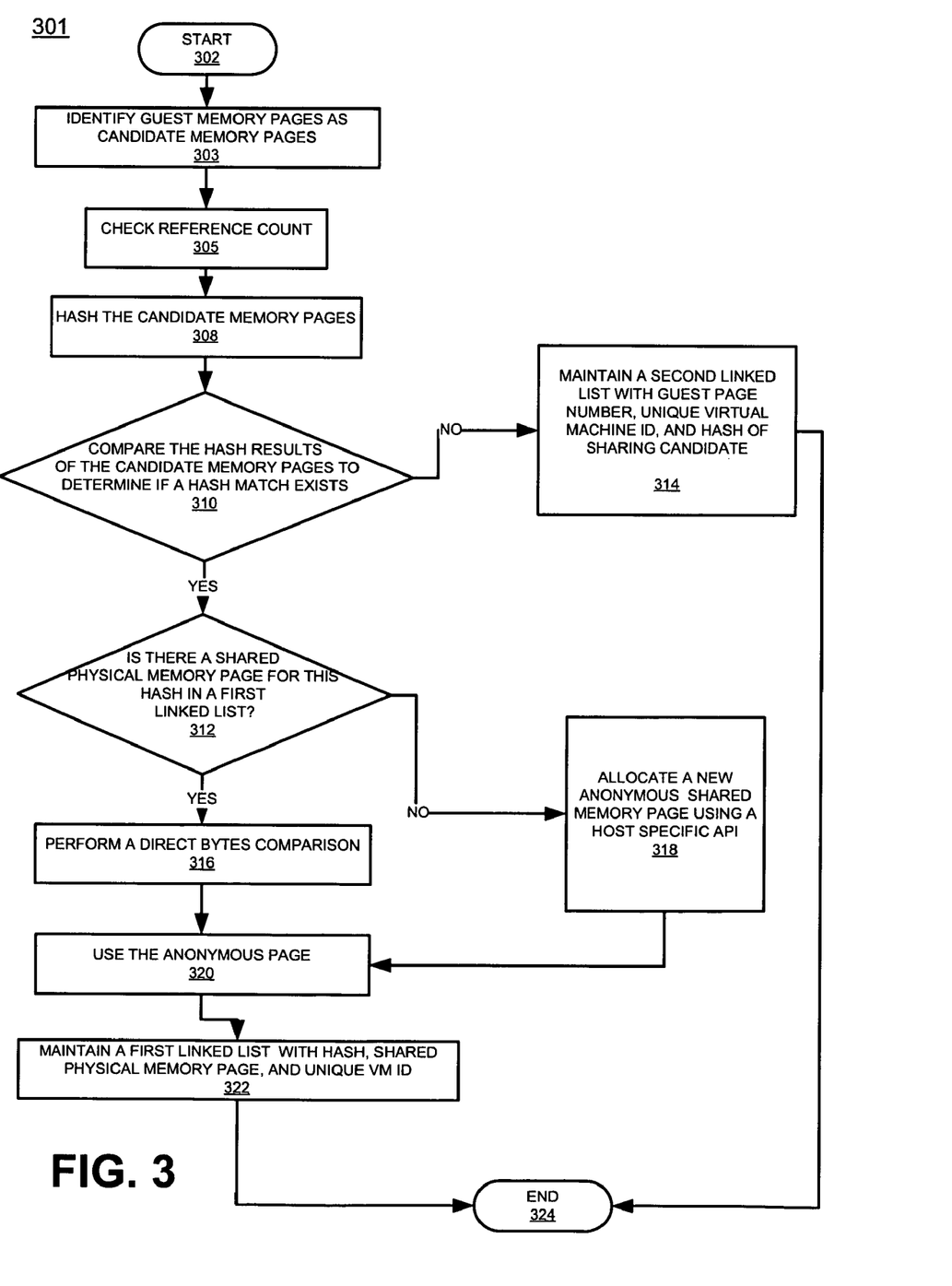
FIG. 3 illustrates a flowchart of a method for sharing memory pages in virtual machines upon which embodiments can be implemented.

FIG. 3 illustrates a flowchart 301 of a method for sharing memory pages in virtual machines upon which embodiments can be implemented. Although specific steps are disclosed in flowchart 301, such steps are exemplary. That is, embodiments are well suited to performing various other or additional steps or variations of the steps recited in flowchart 301. It is appreciated that the steps in flowchart 301 can be performed in an order different than presented.

At block 302, the process starts. At block 303, guest memory pages are identified by a VMM as candidate memory pages. In one embodiment, the virtual machine monitor caches the shared memory pages in an associated TLB for use by a guest operating system. In one embodiment, the guest memory pages are evicted from the Translation Look-Aside Buffers (TLB). In one embodiment, the identifying includes choosing memory pages at random from the guest memory pages. In another embodiment, the candidate memory pages exclude guest memory pages that are in use by an associated host operating system. In one embodiment, the candidate memory pages exclude guest memory pages that are in use by a part of the virtual machine application.

At block 305, a per-VM reference count is checked to ensure that it is not part of pending device access. Reference counting is a technique of storing the number of references, pointers, or handles to a resource such as an object or block of memory. In particular, a per-VM reference count is used to track the number of remaining device accesses associated with a page. In one example, a page is not shared until the per-VM reference count is zero, which indicates device accesses have completed.

At block 308, the candidate memory pages are hashed. In one embodiment, the hashing is implemented by a host driver. Also, although possible, it is not necessary to use the same driver for general VMM-HOS communication. In one embodiment, different hash functions, such as a message digest 5 (MD5) hash function can be used.

At block 310, a host driver compares the hash results of the candidate memory pages to determine if a hash match exists. In one embodiment, the hash results are compared in a user-defined order. In one embodiment, the hash results are compared in a random order. If a hash match does not exist, the process proceeds to block 314. If a hash match exists, the process proceeds to block 312.

At block 312, it is determined whether there is a shared physical memory page for the hash in a first linked list (e.g., a chaining hash table). If it is determined that there is a shared physical memory page for the hash in a first linked list, the process proceeds to block 316. If it is determined that there is not a shared physical memory page for the hash in a first linked list, the process proceeds to block 318.

At block 314, a second linked list (e.g., a chaining hash table) with guest page number, unique virtual machine ID, and hash of the sharing candidate is maintained. In one embodiment, the second list tracks "hint" pages that are potential sharing candidates. The second linked list includes guest page number, unique virtual machine ID, and hash of the sharing candidate.

At block 316, a direct byte comparison is performed. In one embodiment, a host driver performs a direct byte comparison of page contents prior to actually sharing pages.

At block 318, an anonymous memory page is allocated using a host-specific API. At block 320, the anonymous memory page is used. In one embodiment, the anonymous memory page is not mapped on any address space on the host. In one embodiment, the anonymous memory page does not belong to the file backed memory of a virtual machine.

At block 322, the first linked list is maintained with hash, shared physical memory page, and unique VM ID. The first list includes an entry for each shared memory page and its associated hash result, wherein the first list also includes a virtual machine reference count to inform a driver when a shared memory page is no longer in use such that the driver can free memory associated with the unused shared memory page. In one embodiment, the first list is passed back to a virtual machine monitor. At block 324, the process ends.

When a VMM breaks sharing, the VMM expects the content of the guest page to be identical to what is was when the VMM unlocked the page after sharing the page. And in order for the host to provide a guarantee to the VMM that the content of the guest page is identical to what is was when the VMM unlocked the page, the host must swap out the contents of the guest page before reusing the PPN. As a result, when the host reclaims memory by reusing the PPNs unlocked by the VMM, there may be an extra I/O on the host.

In usual operation, the VMM indicates to the host that the VMM wants the content of the page to be preserved by "dirtying" (writing to) the page when unlocking the page. Dirtying a page sets the "dirty" bit in the host page-tables for that page, and at swap-out time, the host knows that the contents must be preserved. If the VMM does not dirty the page in the host page-tables, the host operating system will usually not preserve the content of the page and thus there will be no extra IO due to swap when that particular PPN is reused.

Embodiments set forth methods for avoiding the extra I/O at the page-sharing time. As a shared PPN has identical contents as the PPN being unlocked, the VMM does not dirty the page on the host page-tables when sharing a page even if the VMM wants the contents of a page to be preserved. Consequently, when breaking sharing, the contents of the guest page can be obtained by merely copying it from the shared PPN. The VMM simply doesn't dirty the page in question when breaking sharing and no extra I/O is caused on the host side. In one example of terminating sharing for a guest page, the shared PPN is mapped into the VMX address-space. The contents of the shared PPN are copied into the guest page for which sharing is being broken. Also, the reference count on the shared PPN is decremented.

Figure 4:
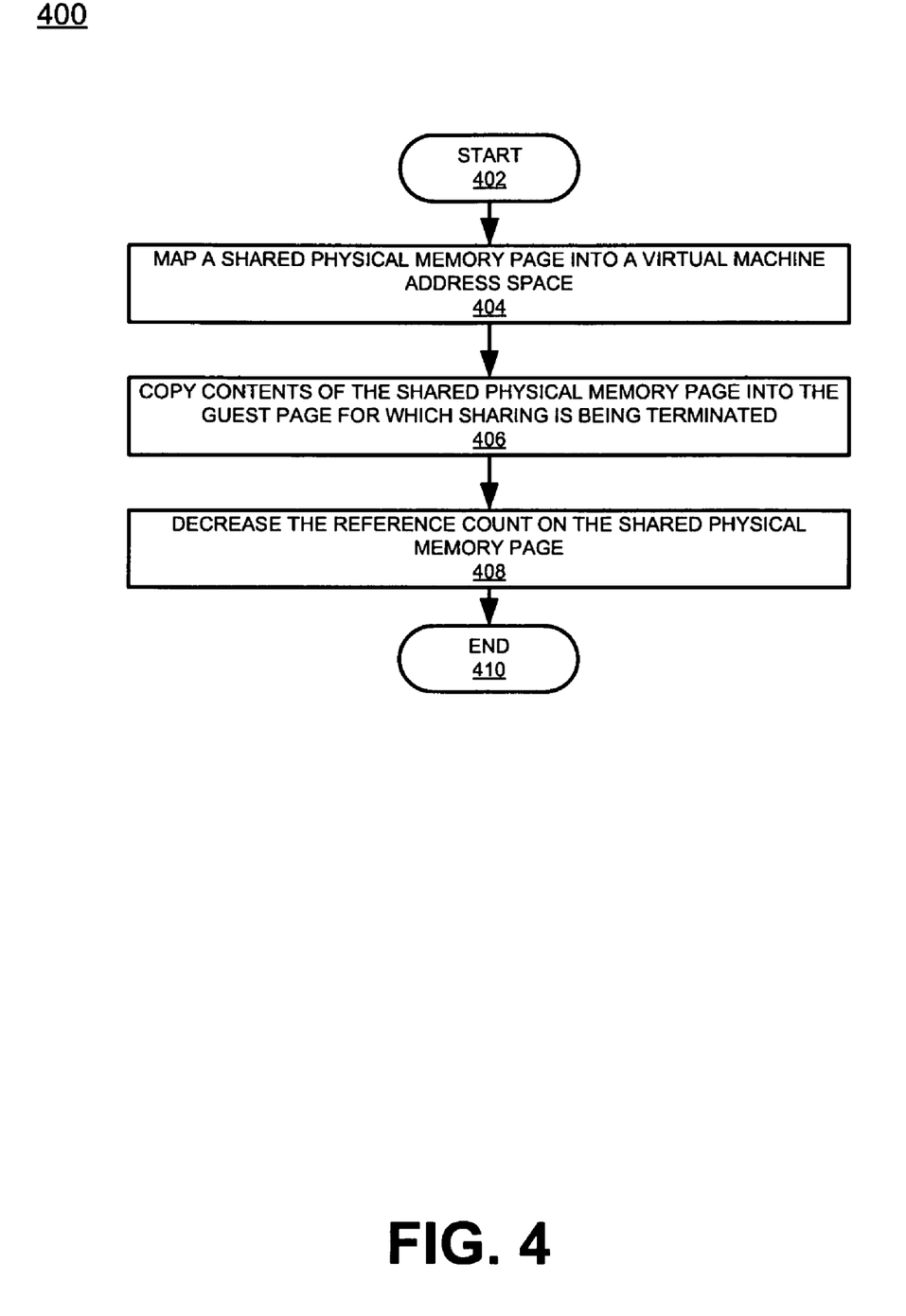
FIG. 4 illustrates a flowchart of method of terminating sharing for a guest page upon which embodiments can be implemented.

Embodiments set forth methods for avoiding the extra I/O at the page-sharing time. FIG. 4 illustrates a flowchart 400 of a method of terminating sharing for a guest page, in accordance with embodiments of the present claimed subject matter. Although specific steps are disclosed in flowchart 400, such steps are exemplary. That is, embodiments are well suited to performing various other or additional steps or variations of the steps recited in flowchart 400. It is appreciated that the steps in flowchart 400 can be performed in an order different than presented.

At block 402, the process starts. At block 404, a shared physical memory page is mapped into a virtual machine address space. At block 406, contents of said shared physical memory page are copied into a guest page for which sharing is being terminated. At block 408, the per-VM reference count is decreased on said share physical memory page. At block 410, the process ends.

In contrast to traditional approaches, embodiments will not dirty the page on the host page tables because the shared physical memory page has the same contents as the physical memory page being unlocked. Hence, the contents of the guest can be obtained by copying it from the shared physical memory page. As a result, no extra I/O is caused on the host side when sharing a guest page.

Figure 5:
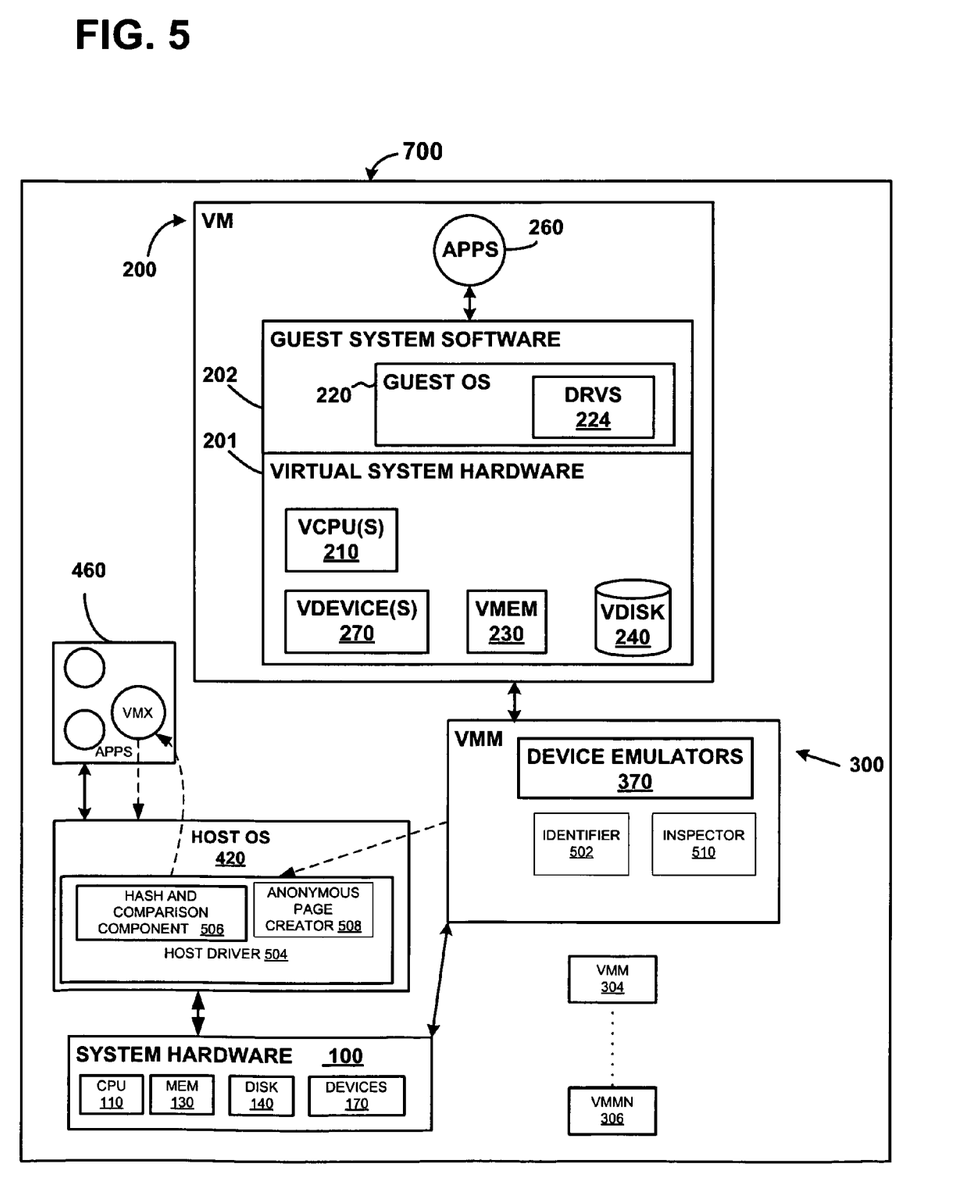
FIG. 5 illustrates block diagrams of a system for sharing memory pages in virtual machines, upon which embodiments can be implemented.

FIG. 5 shows an embodiment of a system for sharing pages in virtual machines. The VMM 300 includes the identifier 502 for identifying potential sharing candidates from guest memory pages, and the inspector 510 for ensuring each of the potential sharing candidates is not being accessed by device emulation code.

Also, in the present embodiment, the Host OS 420 includes the host driver 504, which includes the hash and comparison component 506 and the anonymous page creator 508 for creating an anonymous memory page that includes information of a first potential sharing candidate and a second potential sharing candidate. In one embodiment, the anonymous memory page is not mapped on any address space on the host. Further, in one embodiment, the anonymous memory page does not belong to the file backed memory of a virtual machine.

The hash and comparison component 506 computes a hash of the contents of each of the potential sharing candidates and determines whether a hash match is found between a first potential sharing candidate of the potential sharing candidates and a second potential sharing candidate of the potential sharing candidates. The host driver 504 may also perform some or all of the functions of the driver 425 of FIG. 1.

In one embodiment, if a hash match is found between the first potential sharing candidate of the potential sharing candidates and the second potential sharing candidate then a direct byte comparison is performed between the first potential sharing candidate and the second potential sharing candidate. Also, it is important to note that hashing and comparison may be performed at any level of granularity, although byte-wise comparison will usually be the easiest to implement given the most common processor architectures. Also, although possible, it is not necessary to use host driver 504 for general VMM-HOS communication.

To summarize, methods and systems for sharing memory pages in virtual machines are described. Embodiments allow memory overheads to be significantly reduced, which enhances the efficiency of virtual machines.

Figure 6:
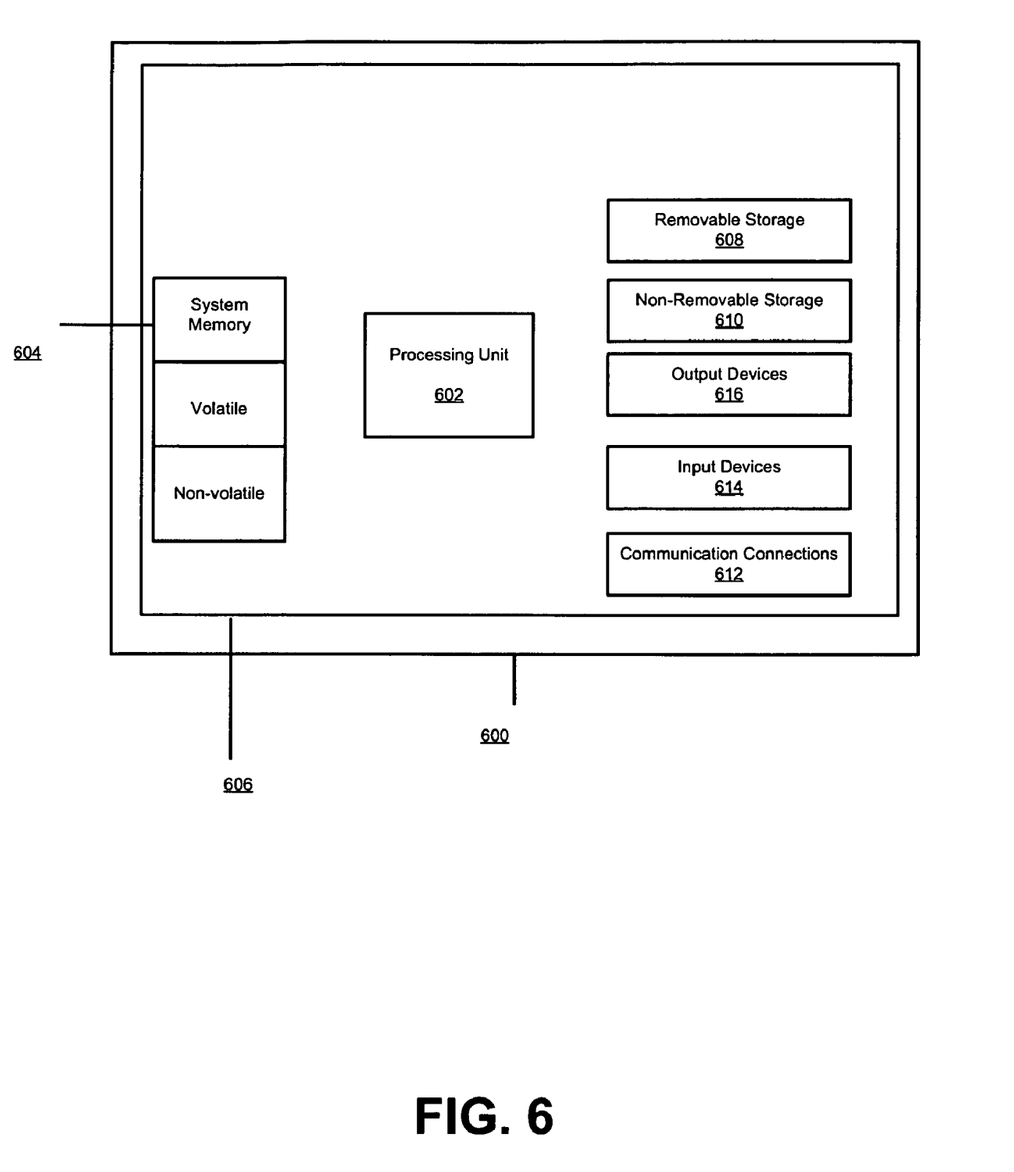
FIG. 6 illustrates block diagrams of an exemplary computing device for implementing the claimed subject matter, in accordance with an embodiment of the present invention.

With reference to FIG. 6, an exemplary system for implementing the claimed subject matter includes a computing device, such as computing device 600. In its most basic configuration, computing device 600 typically includes at least one processing unit 602 and memory 604. Depending on the exact configuration and type of computing device, memory 604 may be volatile (such as RAM), non-volatile (such as ROM, flash memory, etc.) or some combination of the two. This most basic configuration is illustrated in FIG. 6 by dashed line 606. Additionally, device 600 may also have additional features/functionality. For example, device 600 may also include additional storage (removable and/or non-removable) including, but not limited to, magnetic or optical disks or tape. Such additional storage is illustrated in FIG. 6 by removable storage 608 and non-removable storage 610. Computer storage media includes volatile and nonvolatile, removable and non-removable media implemented in any method or technology for storage of information such as computer readable instructions, data structures, program modules or other data. Memory 604, removable storage 608 and non-removable storage 610 are all examples of computer storage media. Computer storage media includes, but is not limited to, RAM, ROM, EEPROM. flash memory or other memory technology, CD-ROM, digital video disks (DVD) or other optical storage, magnetic cassettes, magnetic tape, magnetic disk storage or other magnetic storage devices, or any other medium which can be used to store the desired information and which can accessed by device 600. Any such computer storage media may be part of device 600.

Device 600 may also contain communications connection(s) 612 that allow the device to communicate with other devices. Communications connection(s) 612 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 600 may also have input device(s) 614 such as keyboard, mouse, pen, voice input device, touch input device, etc. Output device(s) 616 such as a display, speakers, printer, etc., may also be included. All these devices are well know in the art and need not be discussed at length here.

What is claimed is:

1. A method for sharing memory pages in virtual machines, said method comprising:
    identifying guest memory pages as candidate memory pages;
    hashing said candidate memory pages;
    comparing the hash results of said candidate memory pages;
    determining whether a hash match exists between a first candidate memory page of said candidate memory pages and a second candidate memory page of said candidate memory pages;
    if said hash match exists, creating an anonymous memory page that includes the information of said first candidate memory page and said second candidate memory page, the anonymous memory page being a memory page that is not mapped in any process address space, wherein the creating includes locking the anonymous memory page in memory; and
    sharing the anonymous memory page.

2. The method of claim 1, wherein said comparing comprises performing a direct bytes comparison between said first candidate memory page and said second candidate memory page.

3. The method of claim 1, further comprising maintaining a first linked list for tracking the status of shared memory pages, wherein said first list includes an entry for each shared memory page and its associated hash result, wherein said first list also includes a virtual machine reference count to inform a driver when a shared memory page is no longer in use such that said driver can free memory associated with said unused shared memory page.

4. The method of claim 1, further comprising:
    maintaining a second linked list of memory pages that are potential sharing candidates;

determining whether a sharing candidate matches a shared memory page, wherein if said sharing candidate does not match at least one shared memory page, then the driver records the guest page number, unique virtual machine ID, and hash of said sharing candidate, wherein if said sharing candidate matches a shared memory page, a new shared memory page is allocated utilizing a host specific Application Program Interface (API).

5. The method of claim 1, wherein said guest memory pages are evicted from a Translation Look-Aside Buffers (TLB) managed by a VMM.

6. The method of claim 1, wherein said candidate memory pages exclude guest memory pages that are in use by an associated host operating system.

7. The method of claim 1, wherein said candidate memory pages exclude guest memory pages that are in use by a part of the virtual machine application.

8. The method of claim 1, wherein said anonymous memory page is not mapped on any address space on the host.

9. The method of claim 1, wherein said anonymous memory page does not belong to a file backed memory of a virtual machine.

10. The method of claim 1, wherein said hashing is implemented by a host driver, wherein said host driver resides in a host operating system.

11. The method of claim 1, wherein said identification includes choosing memory pages at random from said guest memory pages.

12. The method of claim 1, further comprising checking a reference count to ensure device accesses have completed.

13. The method of claim 1, wherein a list is passed back to a virtual machine monitor.

14. The method of claim 13, wherein said virtual machine monitor caches said shared memory pages in an associated TLB for use by a guest operating system.

15. A system for sharing pages in virtual machines, said system comprising:
   an identifier for identifying potential sharing candidates from guest memory pages;
   a host driver for computing a hash of the contents of each of said potential sharing candidates;
   a comparator for determining whether a hash match is found between a first potential sharing candidate of said potential sharing candidates and a second potential sharing candidate of said potential sharing candidates; and
   an anonymous page creator for creating an anonymous memory page that includes information of said first potential sharing candidate and said second potential sharing candidate, wherein the anonymous memory page being a memory page that is not mapped in any process address space, wherein the creating includes locking the anonymous memory page in memory.

16. The system of claim 15, further comprising an inspector for ensuring each of said potential sharing candidates is not being accessed by device emulation code.

17. The system of claim 15, wherein if a hash match is found between said first potential sharing candidate of said potential sharing candidates and said second potential sharing candidate of said potential sharing candidates then a direct byte comparison is performed between said first potential sharing candidate and said second potential sharing candidate.

18. The system of claim 15, wherein said anonymous memory page is not mapped on any address space on the host.

19. The system of claim 15, wherein said anonymous memory page does not belong to a file backed memory of a virtual machine.

20. A computer readable medium having stored therein instructions that when executed by a processor implement a method for sharing memory pages in virtual machines, said method comprising:
   detecting guest memory pages as candidate memory pages;
   hashing said candidate memory pages;
   comparing the hash results of said candidate memory pages;
   determining whether a hash match exists between a first candidate memory page of said candidate memory pages and a second candidate memory page of said candidate memory pages;
   if said hash match exists, creating an anonymous memory page that includes the information of said first candidate memory page and said second candidate memory page, the anonymous memory page being a memory page that is not mapped in any process address space, wherein the creating includes locking the anonymous memory page in memory; and
   sharing said anonymous memory page.

21. The computer readable medium of claim 20, wherein said comparing comprises performing a direct bytes comparison between said first candidate memory page and said second candidate memory page.

22. The computer readable medium of claim 20, further comprising:
   maintaining a first linked list for tracking the status of shared memory pages, wherein said first list includes an entry for each shared memory page and its associated hash result, wherein said first list also includes a virtual machine reference count to inform a driver when a shared memory page is no longer in use such that said driver can free memory associated with said unused shared memory page;
   maintaining a second linked list of memory pages that are potential sharing candidates; and
   determining whether a sharing candidate matches a shared memory page, wherein if said sharing candidate does not match at least one shared memory page, then the driver records the guest page number, unique virtual machine ID, and hash of said sharing candidate, wherein if said sharing candidate matches a shared memory page, a new shared memory page is allocated utilizing a host specific Application Program Interface (API).

* * * * *